(12) United States Patent
Park et al.

(10) Patent No.: US 6,944,802 B2
(45) Date of Patent: Sep. 13, 2005

(54) METHOD AND APPARATUS FOR TRANSMITTING AND RECEIVING WIRELESS PACKET

(75) Inventors: Dong-seek Park, Kyungki-do (KR); Jeong-hoon Park, Kyungki-do (KR); Yung-lyul Lee, Seoul (KR); John Villasenor, Los Angeles, CA (US); Adam H. Li, Los Angeles, CA (US)

(73) Assignees: The Regents of the University of California, Oakland, CA (US); Samsung Electronics Co., Ltd., Kyungki-do (KR)

( * ) Notice: Subject to any disclaimer, the term of this patent is extended or adjusted under 35 U.S.C. 154(b) by 462 days.

(21) Appl. No.: 09/783,333

(22) Filed: Feb. 15, 2001

(65) Prior Publication Data

US 2002/0026614 A1 Feb. 28, 2002

Related U.S. Application Data

(60) Provisional application No. 60/192,937, filed on Mar. 29, 2000.

(30) Foreign Application Priority Data

May 6, 2000 (KR) ......................................... 2000-24209

(51) Int. Cl.⁷ ........................ G06F 11/00; H03M 13/00; H04L 1/00
(52) U.S. Cl. ........................ 714/701; 714/776; 370/242
(58) Field of Search ................................ 370/218, 224, 370/242, 503, 912–913, 471; 714/701, 776

(56) References Cited

U.S. PATENT DOCUMENTS

| | | | | |
|---|---|---|---|---|
| 5,856,979 A | * | 1/1999 | Vogel et al. | 370/503 |
| 5,936,965 A | | 8/1999 | Doshi et al. | |
| 6,104,757 A | | 8/2000 | Rhee | |
| 6,310,897 B1 | * | 10/2001 | Watanabe et al. | 370/522 |
| 6,519,223 B1 | * | 2/2003 | Wager et al. | 370/216 |
| 6,697,352 B1 | * | 2/2004 | Ludwig et al. | 370/349 |
| 6,701,363 B1 | * | 3/2004 | Chiu et al. | 709/224 |

FOREIGN PATENT DOCUMENTS

| | | |
|---|---|---|
| EP | 0782291 A2 | 7/1997 |
| EP | 0 909 040 | 4/1999 |
| EP | 0909040 A2 | 4/1999 |
| EP | 0942569 A2 | 9/1999 |
| EP | 1035682 | 9/2000 |
| JP | 10-313294 | 11/1998 |
| JP | 11-298354 | 10/1999 |
| KR | 96-33096 A | 9/1996 |
| RU | 2103822 | 1/1998 |
| WO | WO 98/59492 | 12/1998 |
| WO | WO 99/21296 | 4/1999 |
| WO | WO 00/04677 | 1/2000 |

OTHER PUBLICATIONS

Balachandran K, et al.: "GPRS–136: High–Rate Packet Data Service for North American TDMA Digital Cellular Systems" IEEE Personal Communications, IEEE Communications Society, US, vol. 6, No. 3, Jun. 1999, pp. 34–47, XP000831519 ISSN: 1070–9916.

K. Balachandran, et al., "GPRS–136: High Rate Packet Data Service for North American TDMA Digital Cellular Systems", IEEE Personal Communications; vol. 6 No. 3; The Evolution of TDMA to 3G; Jun. 1999.

* cited by examiner

*Primary Examiner*—Guy J. Lamarre
*Assistant Examiner*—Cynthia Britt
(74) *Attorney, Agent, or Firm*—Sughrue Mion, PLLC

(57) ABSTRACT

A wireless packetization apparatus for transmitting/receiving multimedia data including video data in a radio transmitting/receiving system, and a method thereof are provided. According to the present invention, error resilience can be increased by adding an error detection code and a corruption indication flag to header information on a radio link protocol (RLP) layer when multimedia data such as video data requiring real time or low delay is transmitted and received in a wireless environment, and a packet drop rate can be thereby reduced.

10 Claims, 3 Drawing Sheets

METHOD AND APPARATUS FOR TRANSMITTING AND RECEIVING WIRELESS PACKET

This application claims the benefit under 35 U.S.C. § 119(e)(1) of and incorporates by reference Provisional Application No. 60/192,937 filed on Mar. 29, 2000.

BACKGROUND OF THE INVENTION

1. Field of the Invention

The present invention relates to a radio transmitting/receiving system. More particularly, the present invention relates to a wireless packetization apparatus for transmitting and/or receiving multimedia data including video data in a radio transmitting/receiving system, and a method thereof.

2. Description of the Related Art

In general, a radio transmitter and a radio receiver employing a phase 1 standard in CDMA 2000 are formed of high-level layers as shown in FIG. 1.

Codec-related standards such as H.324M. H.323, and T.120 correspond to an application layer. A physical layer performs channel coding, PN spreading, and modulation. A media access control (MAC) layer includes a signaling unit (not shown) and a radio link protocol (hereinafter referred to as RLP) (not shown), and the RLP converts payload on the application layer transmitted through a radio path into an input format on the physical layer. The physical layer among the three layers is mainly realized by hardware, and its flexibility is small when its hardware is determined by a standard. However, flexibility can be given to the application layer considering its network-independent portion.

Referring to FIG. 2, one RLP corresponds to each of a number N of applications (application 1, application 2, . . . , and application N). The RLP is connected to a physical layer 240 through a MUX sub-layer 230.

The MUX sub-layer 230 multiplexes a number N of received RLPs adaptively to a protocol data unit (PDU). Here, the multiplex protocol data unit (MUX-PDU) is available in a case where a channel bit error rate is less than 10-6.

Referring to FIG. 3, a TYPE field 310 denotes a frame type, that is, re-transmitted frame or a new frame, and a SEQ field 320 denotes a frame number or a sequence number, and a DATA field 330 denotes a payload received from an application layer. An RLP type 3 as shown in FIG. 3 is a mode, which even allows data to be re-transmitted, and the length of the DATA field 330 is variable in unit of byte. In this case, the length of the entire RLP frame is fixed. However, when even a part of header portions 310 and 320 of the RLP frame is damaged, it is impossible for a recipient to know the exact length of the DATA field 330, and consequently, RLP decoding is not possible.

SUMMARY OF THE INVENTION

To solve the above problems, it is a first object of the present invention to provide a wireless packetization method for increasing error-robustness while reducing overhead so that multimedia data including video data may be suitable in a wireless environment.

It is a second object of the present invention to provide a method for receiving a wireless packet for decoding frame data, which is packetized by the wireless packetization method.

It is a third object of the present invention to provide a wireless packetization apparatus in which the wireless packetization method is implemented.

It is a fourth object of the present invention to provide an apparatus for receiving a wireless packet in which the method for decoding a wireless packet is implemented.

Accordingly, to achieve the first object, there is provided a wireless packetization method in a multimedia transmitting and/or receiving system in a wireless network. The method comprises the steps of: forming a predetermined layer protocol by adding a header to multimedia data which is transmitted through a radio path; and adding an error detection code for detecting an error in the header information and a corruption indication flag for indicating corruption to the data, to the header of the predetermined layer protocol which is formed in the step.

According to another aspect of the first object, there is provided a wireless packetization method for a wireless link layer protocol in a multimedia transmitting apparatus in a wireless network. The method comprises the steps of: forming a wireless link layer protocol by adding a header to multimedia data which is transmitted through an application layer; and adding an error detection code for detecting an error in the header information and a corruption indication flag for indicating corruption to the data, to the header of the wireless link layer protocol which is formed in the step.

In order to achieve the second object, there is provided a method for receiving a wireless packet in a method for decoding data by receiving a packet in which an error detection code for detecting an error in the header information and a corruption indication flag for indicating corruption of the data are added to a header of a radio link layer protocol. The method comprises the steps of: transmitting a RLP frame in a case where there is no error when a data field is checked by an error detection code on a multiplex (MUX) layer, to a next layer and checking an error of the header information by the error detection code in a case where there is some error; and setting the corruption indication flag and re-sequencing data of the data field in a case when there is no error in a header in the step and resetting the corruption indication flag and discarding the entire frame in a case where there is some error.

In order to achieve the third object, there is provided a wireless packetization apparatus for a wireless link layer protocol in a multimedia transmitting system in a wireless network. The apparatus includes a header information-creating unit for creating header information to which an error detection code for detecting an error to the header information relating to multimedia data transmitted through an application layer and a corruption indication flag for indicating corruption in the data are added, and a radio link protocol (RLP) frame-forming unit for forming a radio link frame by multiplexing the header information formed in the header information-creating unit and the data.

In order to achieve the fourth object, there is provided an apparatus for receiving a wireless packet in an apparatus for decoding data by receiving a packet in which an error detection code for detecting an error in the header information and a corruption indication flag for indicating corruption in the data are added to a header of a radio link layer protocol. The apparatus includes a means for transmitting a RLP frame in a case where there is no error when a data field is checked by an error detection code on a multiplex (MUX) layer, to a next layer and for checking an error of the header information by the error detection code in a case where there is some error, and a means for setting the corruption indication flag and for re-sequencing data of the data field in a case when there is no error in a header in the step and for resetting the corruption indication flag and for discarding the entire frame in a case where there is some error.

BRIEF DESCRIPTION OF THE DRAWINGS

The above objects and advantages of the present invention will become more apparent by describing in detail a preferred embodiment thereof with reference to the attached drawings as described below.

DETAILED DESCRIPTION OF THE INVENTION

Figure 4:
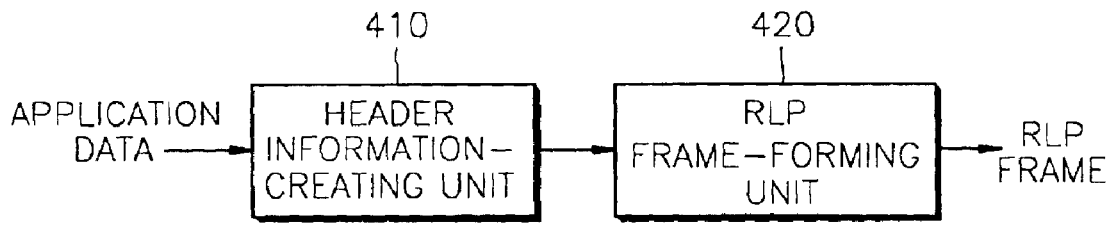
FIG. 4 is a conceptual diagram of RLP framing according to the present invention.

Referring to FIG. 4, a header information-creating unit 410 generates header information, which is matched to application data, that is, a frame type field, a sequence number field, an error detection code, and a corruption flag. Here, the corruption flag is indicated as either "0" or "1", depending on whether the flag is indicating data corruption. A RLP frame-forming unit 420 forms a RLP frame by multiplexing header information and data, which are formed in the header information-creating unit 410.

Figure 5:
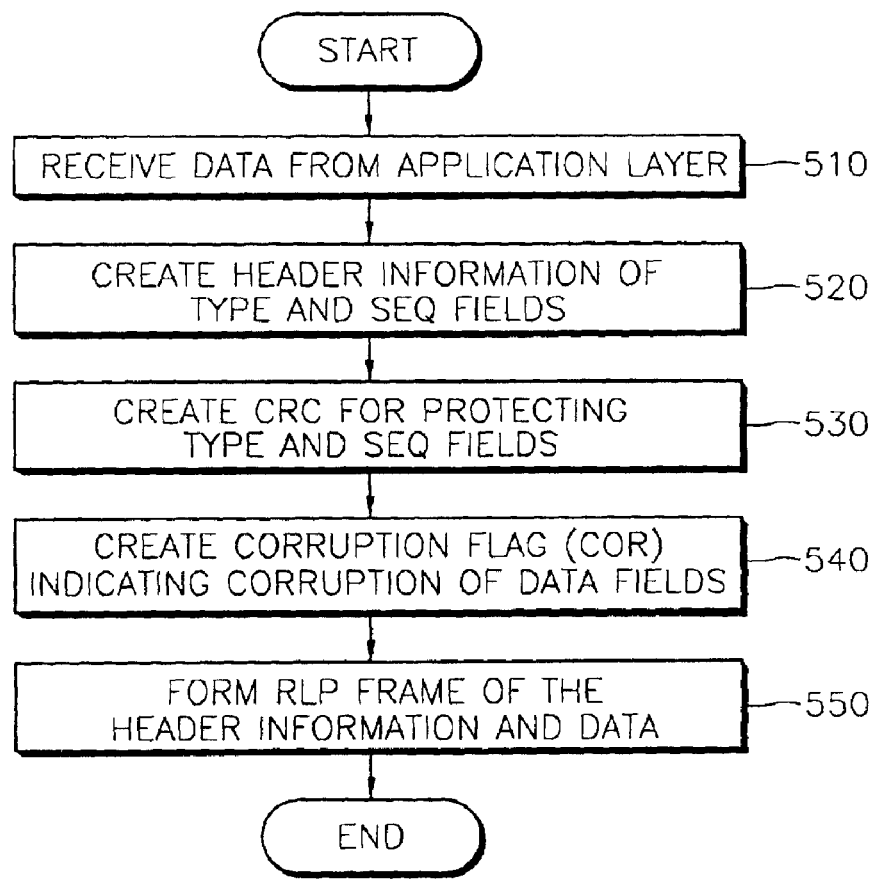
FIG. 5 is a flow chart of RLP framing according to the present invention.

Referring to FIG. 5, a RLP layer receives data from an application layer (step 510).

Next, the RLP layer creates a TYPE field indicating a RLP type and a sequence number field indicating a sequence number (step 520).

Next, the RLP layer creates a cyclic redundancy code (CRC) for detecting and correcting an error by checksumming bits of the TYPE and sequence number fields (step 530).

Next, a corruption flag field indicating corruption of the data field is added to the RLP layer (step 540).

Next, the RLP layer forms a RLP frame of data and header information including the TYPE field, the sequence number field, the CRC field, and the corruption flag field, which are created in the steps 510 to 540 (step 550).

Figure 1:
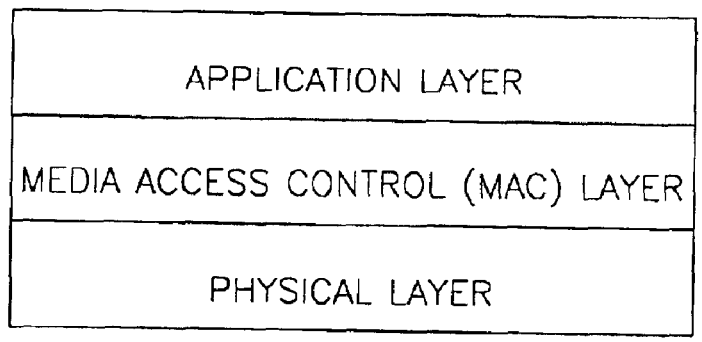
FIG. 1 is a block diagram of a conventional radio transmitter/receiver employing a phase 1 in CDMA 2000.
Figure 2:
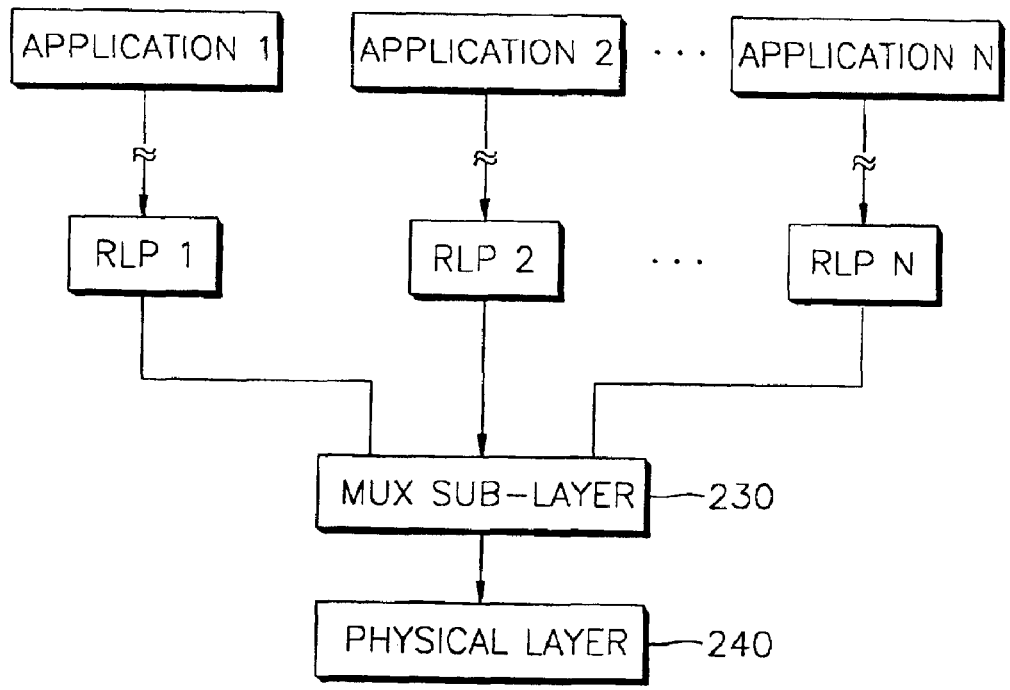
FIG. 2 is a block diagram which illustrates the relationships between RLP and a MUX sub-layer.
Figure 3:
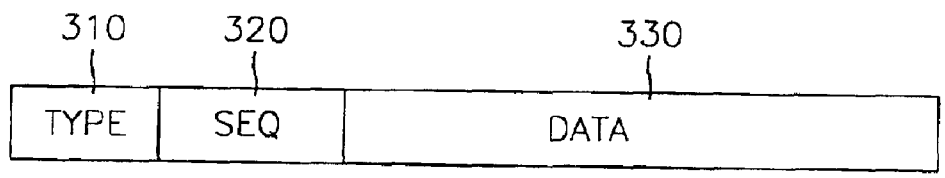
FIG. 3 is a format diagram of a frame of RLP type 3 in CDMA version 2000.
Figure 6:
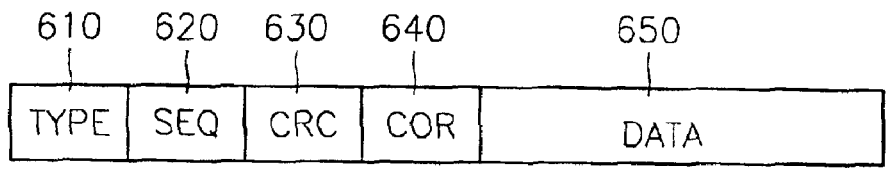
FIG. 6 is a format diagram of a new RLP frame according to FIG. 5.

A RLP frame shown in FIG. 6 is formed of a header portion comprising a TYPE field 610, a sequence number (SEQ) field 620, a CRC field 630, and a corruption flag (COR) field 640, and a data field 650. The CRC field 630 and the COR filed 640 are added to the TYPE field 310 and the SEQ field 320, which are contained in the conventional header (see FIG. 3).

Here, the TYPE field 610 defines a frame type of a RLP. For example, when the TYPE field 610 is comprised of 2 bits, "10" is a new frame, and "11" is a re-transmitted frame. The SEQ field 620 denotes a sequence number and is comprised of 8 bits. The CRC field 630 is a 4-bit CRC for detecting and correcting an error of the TYPE field 610 and the SEQ field 620. Also, people skilled in the art can properly select a polynomial operator p(x) for the CRC of a specific field. For example, in case of 4-bit CRC, the polynomial operator $p(x)=x^4+x^2+x+1$ can be used. The COR field 640 is a flag indicating corruption of data and set by indication on a lower layer rather than a RLP layer. For example, when the COR field 640 is "0", there is no error in the data, and when the COR field 640 is "1", there is some error in the data.

Figure 7:
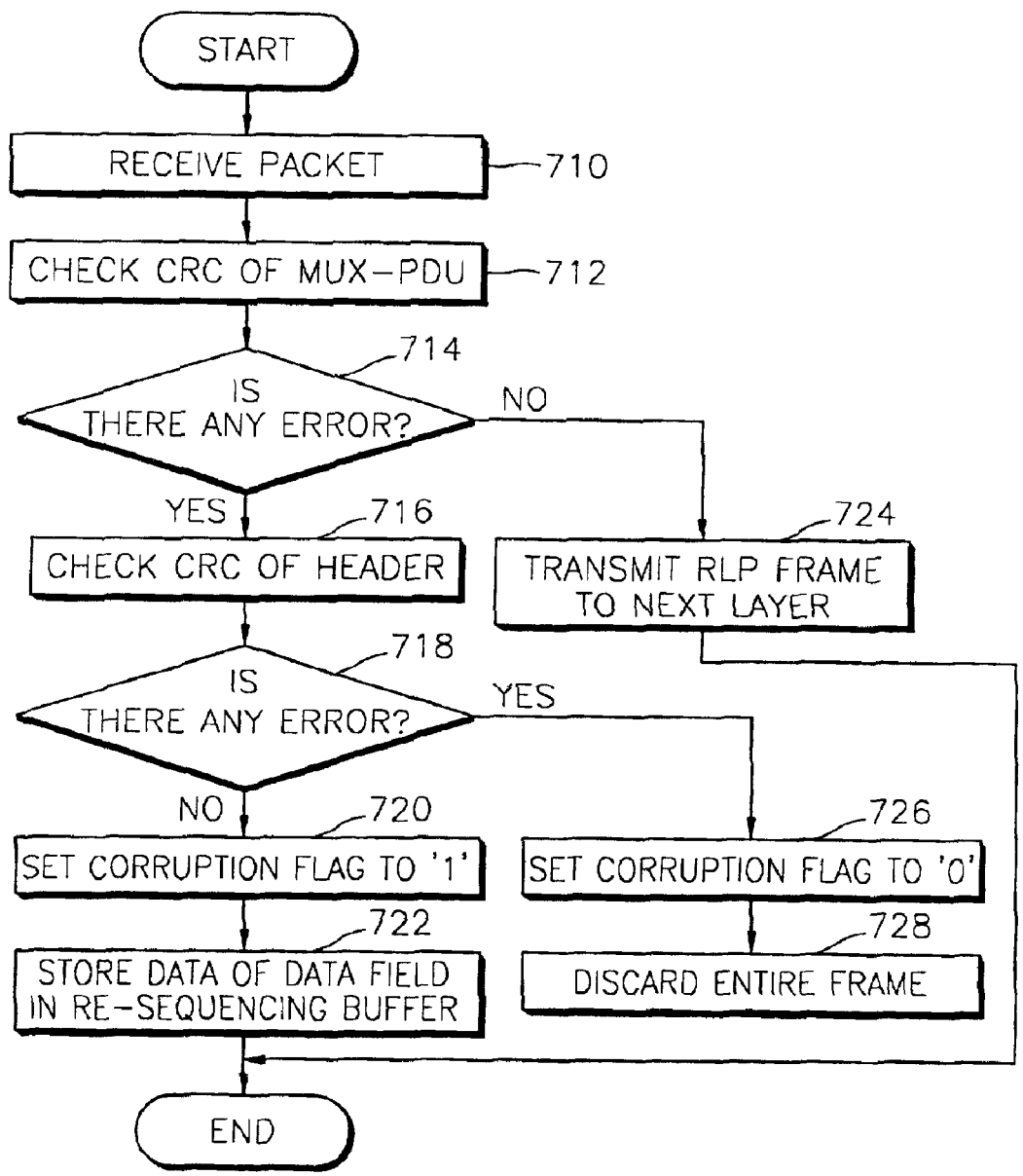
FIG. 7 is a flow chart for decoding the RLP frame of FIG. 6.

Accordingly, a preferred embodiment used for decoding the encoded RLP frame on the RLP layer of a recipient will be described with reference to FIG. 7.

First, a RLP frame is decoded by receiving a packet on the RLP layer (step 710).

Next, the RLP layer checks data by an error detection code (CRC) of the data field 650, which is formed in MUX-PDU on a MUX sub-layer (steps 712 and 714). Here, the RLP layer transmits the RLP frame to an application layer after setting the COR field 640 to "0" in a case where there is no error in the data field 650 (step 724).

However, in a case where some error is detected in the data field 650, the RLP layer checks for an error in the TYPE field 610 and the SEQ field 620 using the error detection code (CRC), which is contained in the header (steps 716 and 718). Here, the RLP layer sets the COR field 640 to "1", which corresponds to data corruption (step 720) in a case where any error is not detected in the header. In a case where any error is detected in the header, the RLP layer sets the COR field 640 to "0" (step 726). When the COR field 640 is "1", the sequence number of the SEQ field 620 is increased by 1, and the data of the data field 650 is stored in a re-sequencing buffer (not shown) (step 722). But when the COR field 640 is "0", the sequence number SEQ is unknown which results in the entire RLP frame being discarded (step 728).

In this way, the recipient error detects header information such as the TYPE field 610 and the SEQ field 620 by the error detection code (CRC) 630 when decoding the encoded RLP frame, and it is known by the COR field 640 whether there is some error in the data or not.

Also, corruption of data is determined through the COR field 640 when decoding means error resilience can be increased.

The above encoding and decoding methods can be embodied in a computer program. Codes and code segments encompassing the program can be easily inferred to by a skilled computer programmer in the art. Also, the program can be realized in media used in a computer and in a common digital computer for operating the program. The program can be stored in computer readable media. The media can include magnetic media such as a floppy disk or a hard disk and optical media such as a CD-ROM or a digital video disc (DVD). Also, the program can be transmitted by carrier waves such as the Internet.

As described above, error resilience can be increased by adding an error detection code and a corruption indication flag to header information on a radio link protocol (RLP) layer when multimedia data such as video data requiring real time or low delay is transmitted and received in a wireless environment, and a packet drop rate can thereby be reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A wireless packetization method in a multimedia transmitting and/or receiving system in a wireless network, comprising the steps of:

forming a predetermined layer protocol by adding a header to multimedia data which is transmitted through a radio link protocol (RLP) layer; and adding an error detection code for detecting an error in the header information and a corruption indication flag for indicating corruption of the data on a lower multiplex-protocol data unit (MUX-PDU) layer than the RLP layer, to the header of the predetermined layer protocol.

2. The wireless packetization method according to claim 1, wherein the corruption indication flag is set as a result of the error when the error detection code for the header information is checked.

3. A wireless packetization method for a wireless link layer protocol in a multimedia transmitting apparatus in a wireless network, comprising the steps of:

forming a wireless link layer protocol by adding a header to multimedia data which is transmitted through an application layer; and adding an error detection code for detecting an error in the header information and a corruption indication flag for indicating corruption of the data on a lower multiplex-protocol data unit (MUX-PDU) layer than the application layer, to the header of the wireless link layer protocol.

4. The wireless packetization method according to claim 3, wherein the error detection code error detects between at least one radio link protocol (RLP) type information and sequence number information, which are set to the header of the wireless link layer protocol.

5. The wireless packetization method according to claim 3, wherein the corruption indication flag indicates a data error received on a layer lower than the wireless link layer protocol.

6. The method for transmitting a wireless packet according to claim 3, wherein the corruption indication flag indicates an error of data contained in multiplex-protocol data unit (MUX-PDU) on a multiplex (MUX) sub-layer.

7. A method for receiving a wireless packet in a method for decoding data by receiving a packet in which an error detection code for detecting an error in the header information and a corruption indication flag for indicating corruption of the data are added to a header of a radio link protocol (RLP) layer, comprising the steps of:

transmitting a RLP frame, in a case where there is no error when a data field is checked by an error detection code on a multiplex (MUX) layer, to a next layer and checking an error of the header information by the error detection code in a case where there is some error; and setting the corruption indication flag and re-sequencing data of the data field in a case when there is no error in the header information and resetting the corruption indication flag and discarding the entire frame in a case where there is some error in the header information;

wherein the corruption indication flag indicates corruption of the data on a lower multiplex-protocol data unit (MUX-PDU) layer than the RLP layer.

8. The method for receiving a wireless packet according to claim 7, wherein the error detection code on the MUX layer is a code for checking the error of the data field in multiplex-protocol data unit (MUX-PDU).

9. A wireless packetization apparatus for a wireless link layer protocol in a multimedia transmitting system in a wireless network, comprising:

a header information-creating unit for creating header information having an error detection code for detecting an error in a header information relating to multimedia data transmitted through an application layer and a corruption indication flag for indicating corruption of the data on a lower multiplex-protocol data unit (MUX-PDU) layer than the application layer; and a radio link protocol (RLP) frame-forming unit for forming a radio link frame by multiplexing the header information formed in the header information-creating unit and the data.

10. An apparatus for receiving a wireless packet in an apparatus for decoding data by receiving a packet in which an error detection code for detecting an error in a header information and a corruption indication flag for indicating corruption of data are added to a header of a radio link protocol (RLP) layer, comprising:

a means for transmitting a RLP frame, in a case where there is no error when a data field is checked by an error detection code on a multiplex (MUX) layer, to a next layer and for checking an error of the header information by the error detection code in a case where there is some error; and a means for setting the corruption indication flag and for re-sequencing data of the data field in a case when there is no error in a header and for resetting the corruption indication flag and discarding the entire frame in a case where there is some error;

wherein the corruption indication flag indicates corruption of the data on a lower multiplex-protocol data unit (MUX-PDU) layer than the RLP layer.

* * * * *